PSEUDO-ORTHOGONAL PULSE CODE SYSTEM

Filed March 2, 1967 3 Sheets-Sheet 1

INVENTOR.
FRANK S. GUTLEBER
BY
Alfred C. Hill
AGENT

PSEUDO-ORTHOGONAL PULSE CODE SYSTEM

Filed March 2, 1967 3 Sheets-Sheet 2

INVENTOR.
FRANK S. GUTLEBER
BY
Alfred C. Hill
AGENT

PSEUDO-ORTHOGONAL PULSE CODE SYSTEM

Filed March 2, 1967 3 Sheets-Sheet 3

INVENTOR.
FRANK S. GUTLEBER
BY Alfred C. Hill
AGENT

United States Patent Office 3,484,554

Patented Dec. 16, 1969

3,484,554
PSEUDO-ORTHOGONAL PULSE CODE SYSTEM

Frank S. Gutleber, Wayne, N.J., assignor to International Telephone and Telegraph Corporation, a corporation of Delaware Filed Mar. 2, 1967, Ser. No. 620,092
Int. Cl. H04j 3/02
U.S. Cl. 179—15 12 Claims

ABSTRACT OF THE DISCLOSURE

*mm'* different code signals are provided by combining a first pulse selected from *m* time orthogonal pulses with a second pulse selected from *m'* time orthogonal pulses, where the *m* and *m'* time orthogonal pulses are time orthogonal with respect to each other. The code signals are selected to convey intelligence. *mm'* detectors each respond to a different one of the code signals and include a source of pulses time coincident with the pulses of the associated code signal, two correlation detectors to detect the pulses of the associated code signal, and a coincidence device to produce an output when the pulses of the associated code signal are detected. The output of the coincidence devices are utilized to recover the intelligence.

BACKGROUND OF THE INVENTION

This invention relates to pulse code systems and more particularly to an improved pulse code system for data handling systems, such as data communication systems. digital computers and the like.

PCM (pulse code modulation) systems may be classified as being orthogonal or non-orthogonal depending upon the type of code employed. An orthogonal PCM system employs a code in which there is no cross-talk or interference between a plurality of code signals, each of which represent a different piece of information, such as an address or amplitude value of an analog signal sample. A simple example of an orthogonal system employs a frequency division multiplex code arrangement in which the different code signals use different non-overlapping frequency bands. Another example is a time division multiplex code arrangement in which all code signals use the same frequency band, but each code signal uses a fraction of a time which does not overlap the time intervals allocated to other code signals. Still another example is what may be termed a phase division multiplex code arrangement in which the code signals are represented by different 90° phase relationships of a single or plurality of frequencies where the phase and frequency relationships of each code signal is in a non-overlapping relationship with the frequency and phase relationship allocated to the other code signals. A non-orthogonal PCM system employs a code arrangement in which the code signals interfere with each other in one or more code digit. An example of such a non-orthogonal system is what might be termed a standard binary PCM system wherein a plurality of code digits may have one of two conditions and the code digits of one code signal are in an interfering relationship with the code digits of the other code signals capable of being provided by the number of code digits employed.

Theoretically, an orthogonal code is the most efficient method of encoding, however, in general the equipment for generating the same is more complex than the equipment for generating a standard binary pulse code. The available code levels in standard binary code are in general much greater for a given time bandwidth product than the available code levels of an orthogonal code. This can be illustrated by assuming that there are $2m$ frequency or time slots available for an orthogonal code in a given time bandwidth product. If the number of code digits $n$ is equal to one, there is available $2m$ code signals or levels. If on the other hand the same number of frequency or time slots were available for a standard binary code, the number of code digits per code signal would be equal to $2m$ and there would be available $2^n=2^{2m}$ code signals.

SUMMARY OF THE INVENTION

An object of this invention is to provide a third classification for a pulse code system whereby the equivalence of orthogonality is maintained but with an increase in the quantity of available code signals within the same time bandwidth product of an orthogonal system.

Another object of this invention is to achieve the pseudo-orthogonal code system of this invention with the equipment for the encoding and decoding being simplified relative to the previously known equipment to achieve orthogonal and non-orthogonal code systems.

Still another object of this invention is to provide a pseudo-orthogonal pulse code system utilizing multiplexing techniques (either time or frequency) in conjunction with correlation techniques in the code signal detector.

A feature of this invention is to provide a pseudo-orthogonal pulse code system for data handling systems or the like comprising first means to generate at least a first group of orthogonal pulses, second means to generate at least a second group of orthogonal pulses, the second group of pulses being orthogonal with respect to the first group of pulses, third means coupled to the first and second means for combining a pulse of the first group of pulses with a pulse of the second group of pulses to make available a plurality of pseudo-orthogonal pulse code signals each representing a different one of a plurality of different pieces of information, and fourth means coupled to the third means to select appropriate ones of the code signals to convey intelligence.

Another feature of this invention is to provide a pseudo-orthogonal code system which makes available *mm'* code signals, where *m* is equal to the number of pulses of said first group of pulses and *m'* is equal to the number of pulses of said second group of pulses.

A further feature of this invention is to provide a pseudo-orthogonal pulse code system wherein the *mm'* code signals are achieved by two code digits per code signal in contrast to standard binary PCM where more code digits are required to produce the same number of code signals.

Still another feature of this invention is to provide in conjunction with the first, second and third means, mentioned above, a plurality of fifth means coupled to the third means with each of the fifth means detecting a different one of the code signals and sixth means coupled to the plurality of fifth means to recover the conveyed intelligence.

Still a further feature of this invention is the provision for each of the fifth means, mentioned hereinabove, to include correlation detecting means coupled to the third means and logic circuit means coupled to the correlation detecting means.

BRIEF DESCRIPTION OF THE DRAWING

The above mentioned and other features and objects of this invention will become more apparent by reference to the following description taken in conjunction wtih the accompanying drawings, in which.

DESCRIPTION OF THE PREFERRED EMBODIMENT

For purposes of explanation the description will be directed to the generation of the pseudo-orthogonal code of this invention illustrating the advantages thereof over the prior orthogonal and non-orthogonal codes, utilizing time division multiplex techniques. It should be noted, however, that the same advantages can be obtained with appropriate modification to the disclosed circuitry, for frequency division multiplex techniques.

Figure 1:
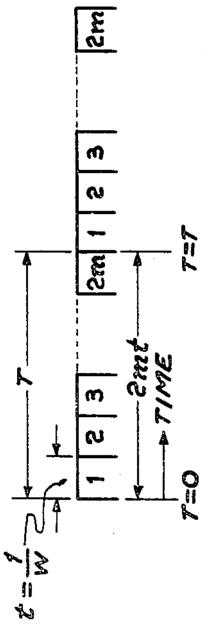
Fig. 1 (PRIOR ART)
FIG. 1 illustrates graphically the format of a prior art orthogonal pulse code.

FIG. 1 illustrates a prior art orthogonal code format without multiplexing where orthogonality must be maintained over a code length $2m$.

Figure 2:
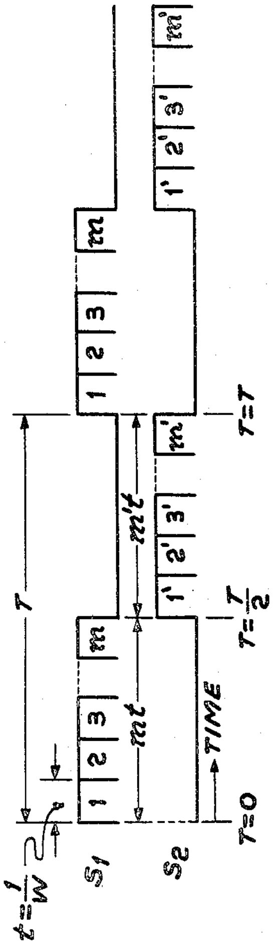
FIG. 2 illustrates graphically the format of the pseudo-orthogonal pulse code in accordance with the present invention utilizing time multiplex techniques.

FIG. 2 illustrates the required time relationship between the two signals S1 and S2. In the code format of FIG. 2, the pseudo-orthogonal code format of the present invention, the orthogonality of the code need only be over $m$ code digits.

The main advantage of the pseudo-orthogonal codes of the present invention is the increased number of code signals that can be generated without cross-talk or interference between any of the total number of separate code levels. It is well known that the maximum possible number of non-interfering levels is equal to the 2TW when pure orthogonal codes are utilized, where T is equal to the information sampling period and W is equal to the carrier bandwidth. Practical orthogonal systems having the code format as illustrated in FIG. 1 generally operate with TW or $2m$ separate code signals. In many applications, this represents a severe limit. A good example of this limitation is in a multiple access communication system where a large quantity of separate code signals are used for address purposes.

For the proposed system, the maximum possible number of code signals which can be generated is equal to $mm'$, where one pulse of a group of $m$ pulses and one pulse of a group of $m'$ pulses are multiplexed to form one complete code signal. If $m$ and $m'$ are equal, the maximum number of code signals available is $m^2$. In general, $m^n$ possible code signals would exist for a system when multiplexing $n$ separate signals. To verify that this is so, consider the two multiplex signals as being represented by S1$i$ and S2$j$. Further, let it be assumed that S1$i$ comprises an orthogonal set of $m$ digits and the S2$j$ comprises the same orthogonal set of $m$ digits. Hence, S1$i$ may exist for $i$ equal to 1 to $i$ equal to $m$. For each S1$i$, S2$j$ may exist for $i$ equal 1 to $i$ equal $m$. The total number of possible codes is given by $ST=S1i+S2j$.

Therefore, the total number of possible distinct codes is $m$ summed $m$ times, or $m^2$. It should be remembered, however, that the number of $m$ digits need not be equal in both the orthogonal groups or pulses and, thus, the available number of code signals in general would be $mm'$. Of this total quantity, an output from any one can only occur at one time, hence, the system is referred to as pseudo-orthogonal. That is, all the available codes would not be truly orthogonal codes as the definition implies, however, the system would perform as though the code signals were orthogonal due to the method of operation in generating the codes and the final method of detection.

Figure 3:
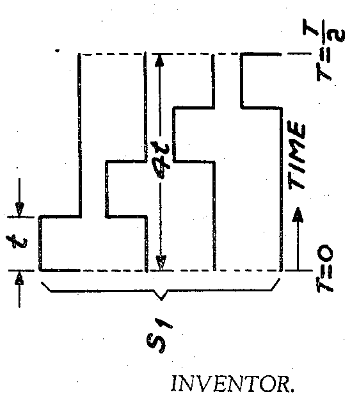
FIGS. 3 and 4 illustrate an example of the two groups of orthogonal pulses which are utilized by appropriately combining pulses thereof to provide the code signals in accordance with the principles of the present invention.

The operation of the proposed system will be illustrated with simple orthogonal on-off pulse groups. Consider that $m$ is equal to four and that the group of orthogonal pulses S1 is as illustrated in FIG. 3. Each possible code digit may now be combined with each of the pulses of a second group of orthogonal pulses which for purposes of illustration is considered to be identical with S1 and is illustrated as S2 in FIG. 4. Then the total number of possible code signals is shown in FIG. 5.

Figure 5:
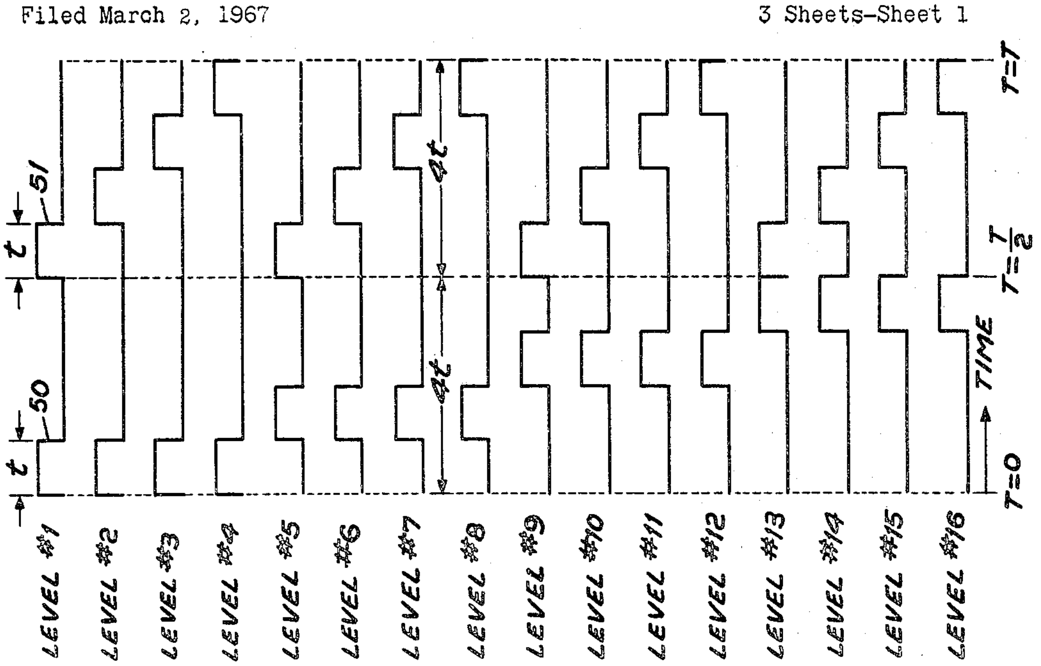
FIG. 5 illustrates the code signals generated from the groups of pulses of FIGS. 3 and 4.

Referring to FIG. 5, it will be observed that there may be interference in group S1 or group S2, but there would not be any interference in the final detected output between any of the illustrated code signals ($m^2=4^2=16$). When a pulse of S1 pulse group interfere, such as illustrated for levels 1 through 4, the end portion derived from S2 is orthogonal which prevents interference in the output. It will be observed in addition that the first pulse of pulse group S2 interferes in levels 1, 5, 9, and 13, but that the pulse for these levels derive from pulse group S1, are orthogonal and, therefore will prevent interference in the output.

It should be further observed that a total number of 16 levels or code signals are obtained in the pseudo-orthogonal code of the present invention by using only two code digits. To generate the same number of code signals in standard binary PCM, four code digits would be required. Thus, the code of the present invention produces the same number of code signals as standard binary PCM with a saving of two code digits per code signal. This saving can be more dramatically illustrated by comparing the generation of 64 code signals in standard binary PCM and the present pseudo-orthogonal code. In standard binary PCM, six code digits per code signals are required ($2^n=2^6$, where $n$ equals the number of required code digits). In the present code, set $m=m'$ and $m=8$. Thus, $m^2=8^2=64$ levels with each code signal still containing only two code pulses or digits.

The following example will be considered in order to demonstrate the usefulness of the proposed code system. Assume that a total maximum bandwidth of one megacycle is available for a voice network and that the required minimum sampling rate for the voice data is 10 kilocycles. If this system is operating as a truly orthogonal system, there would be $$N=TW=\left(\frac{1}{10K}\right)\times 1(10^6)=100$$

available orthogonal code signals possible. Let it further be assumed that 16 levels are required to reduce the quantization noise to an acceptable value or equivalently, 16 quantized levels are necessary in order to achieve the required fidelity. The 16 levels are needed for each user, therefore, the maximum theoretical possible number of simultaneous users the system could accommodate is 100/16=6.

Now consider the code system of the present invention with the same restriction. Since the TW product equals 100, there will be 50 time slots available for each multiplexed signal. Also, to achieve the required number of levels for each user, it is necessary to use four time slots for each multiplexed signal. Hence, there is available 50/4=12 user slots for the system of this invention which is twice as many as for a standard orthogonal system.

In general, the possible increase in users when utilizing the system of this invention in a multiple access environment is a function of the required number of quantized levels and the quantity of multiplexed signals used per pulse group. The following derivation yields an equation which identifies what the increase would be. Let Q=required number of quantized levels; T=required information sampling rate. Then for an orthogonal system $Q=W_oT$, or $W_o=Q/T$, where $W_o$=required bandwidth of orthogonal system. For the proposed pseudo-orthogonal system of this invention $$\left(\frac{TW_p}{n}\right)^n=Q,\text{ or } W_p=\frac{nQ^{\frac{1}{n}}}{T}$$

where $W_p$=required bandwidth of pseudo-orthogonal system and $n$=quantity of multiplexed signals. Now the ratio of the required bandwidth for an orthogonal system to the required bandwidth for the pseudo-orthogonal system signifies how many more users the system of this invention can accommodate than the standard orthogonal systems. For instance, $$\frac{W_o}{W_p}=\frac{Q\left(1-\frac{1}{n}\right)}{n}$$

When $$n=2\ \frac{W_o}{W_p}=\frac{\sqrt{Q}}{2}$$

For the illustrated example, Q=16, or $$\frac{W_o}{W_p}=\frac{\sqrt{16}}{2}=2$$

Therefore, since the orthogonal system could accommodate 6 users, the proposed system can accommodate 2×6=12 users without any interference between the users.

Let us consider a somewhat more dramatic example. Assume that a system must operate with 400 quantized levels. Then if the number of multiplexed signals is 2, the proposed system could accommodate $$\frac{W_o}{W_p}=\frac{\sqrt{400}}{2}=\frac{20}{2}=10$$

times more users in the same confined bandwidth.

Figure 4:
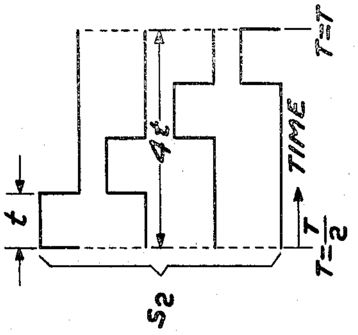
Figure 6:
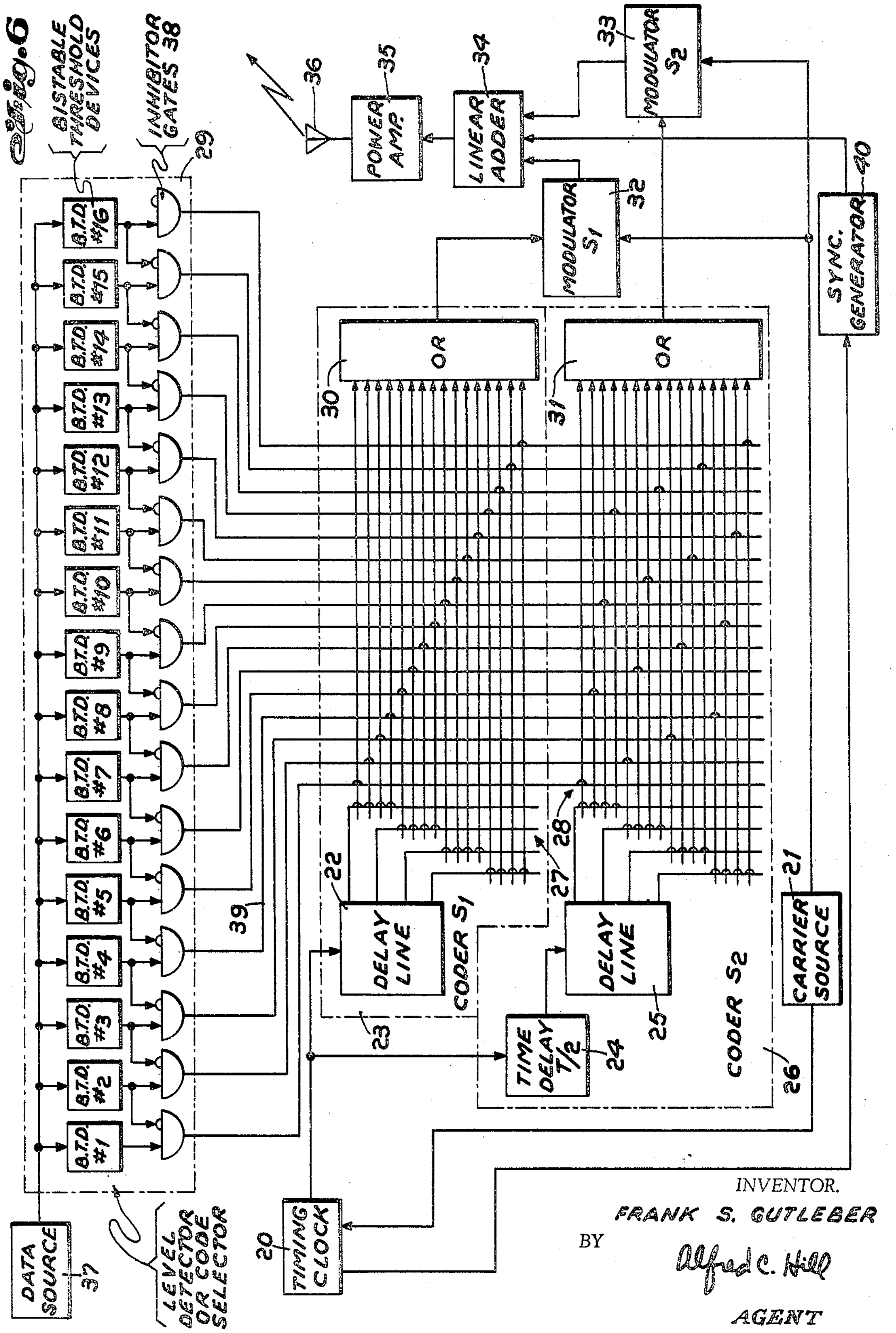
FIG. 6 is a block diagram illustrating the generation of the pseudo-orthogonal code signals in accordance with the principles of this invention.

Referring to FIG. 6, there is illustrated therein an example of equipment which will generate from the pulse groups of FIGS. 3 and 4, the code signals of FIG. 5. An output of timing clock 20 referenced to the carriers source 21 is applied directly to delay line 22 of the S1 coder 23. The group of S1 pulses, as illustrated in FIG. 3, will appear at the output taps of delay line 22. The output of clock 20 is also coupled to a time delay 24 having a delay equal to $T/2$ prior to being coupled to delay line 25 of the S2 coder 26. The output from the taps of delay line 25 is illustrated in FIG. 4. The output of delay line 23 and the outputs of delay line 25 are coupled to a matrix including matrix sections 27 and 28 included in coders 23 and 26, respectively. The semicircle connecting the horizontal and vertical lines of matrix sections 27 and 28 represent the input diodes of an AND circuit. Matrix section 27 and 28 effectively combine one pulse from signal S1 with one pulse from signal S2 in an appropriate manner to make available the 16 code signals illustrated in FIG. 5. The vertical lines of the matrix sections 27 and 28 are connected to a level detector or code selector 29 which operates to couple the proper code signal through OR gates 30 and 31 for application to modulators 32 and 33 prior to being coupled to linear adder 34 for combining therein and transmission from amplifier 35 via antenna 36.

As illustrated in FIG. 6, level detector 29 is coupled to a data source 37. The output from data source 37 is coupled to sixteen bistable threshold devices BTD each of which is arranged to respond to a different level of data amplitude to provide the sixteen quantized levels represented by the codes generated in coders 23 and 26. To assure that only one level is detected, the output of the threshold devices BTD are coupled to inhibitor gates 38 in the manner illustrated so that when threshold devices BTD has its threshold level exceeded by the data of source 37 this device is rendered conductive to provide an output to one of the vertical lines of matrix sections 27 and 28 and also an output to the inhibit input of the preceding gate 38 to thereby block this preceding threshold device from providing an output on the vertical lines of matrix sections 27 and 28. Thus, if the bistable threshold device for level #5 has its threshold exceeded bistable devices #1 through 5 will be in the conductive condition but due to the connection to the inhibit gates 38 associated therewith only an output will appear on the vertical line 39 which selects the code representing level #5 in FIG. 5.

To provide synchronization between the transmitter and receiver, clock 20 provides an output to synchronizing generator 40 whose output is coupled to adder 34 and, hence, is combined wtih the code signal selected.

Rather than employing the bistable threshold device and inhibitor gates as illustrated for level detector 29, it would be possible to provide an appropriate source and switch arrangement for each of the vertical lines of matrix sections 27 and 28 so that the code signal can be appropriately generated. This arrangement could be utilized in a multiple access environment wherein it is desired to select a particular address represented by one of the available code signals.

Figure 7:
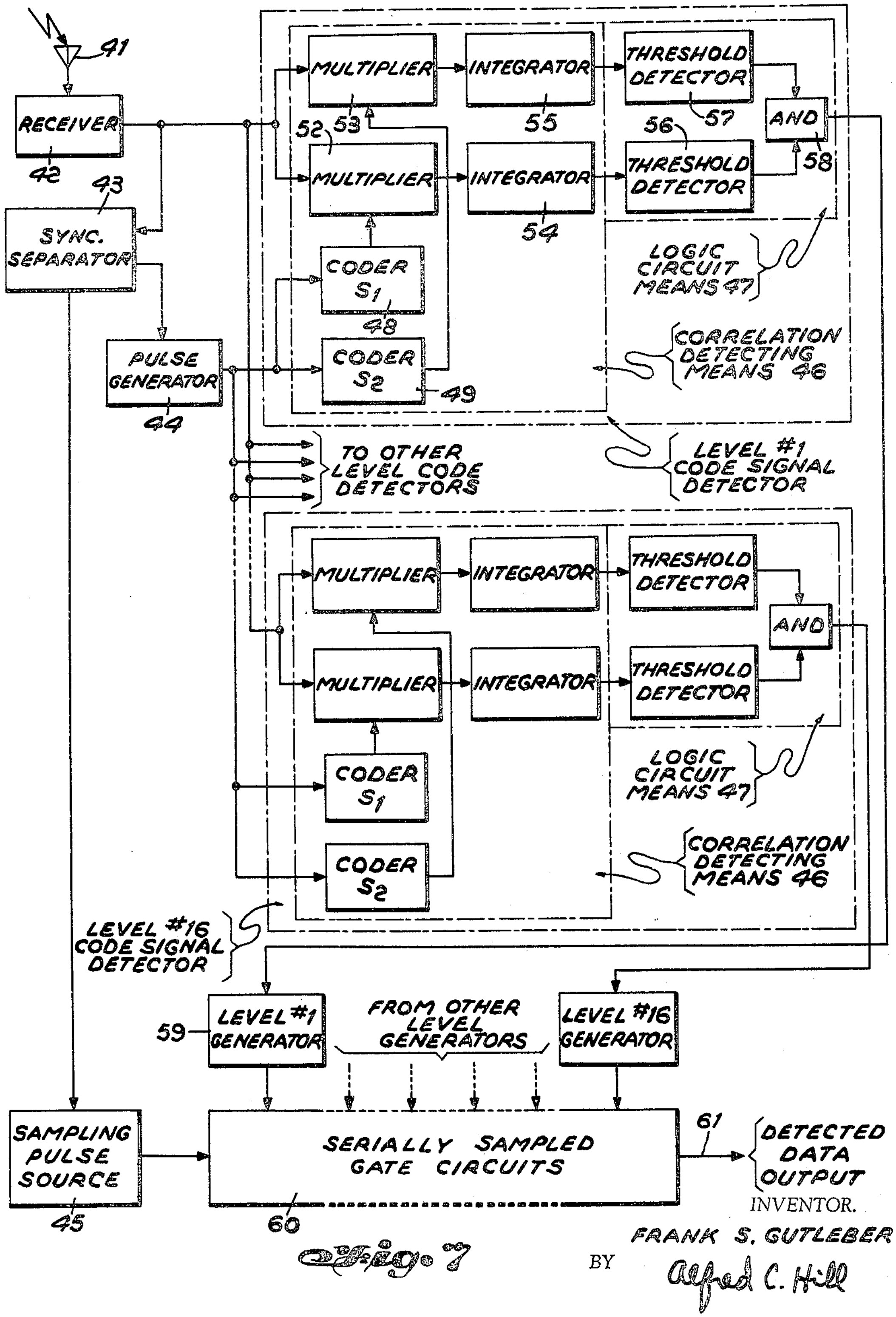
FIG. 7 is a block diagram illustrating the detecting arrangement in accordance with the principles of this invention.

Referring to FIG. 7, the signals transmitted from antenna 36 are received on antenna 41 and coupled to receiver 42. The output of receiver 42 is coupled to the sync separator 43 which energizes a pulse generator 44 and a sampling pulse source 45. The output from receiver 42 is also coupled to each of the code signal detectors where each of the code signal detectors respond to a different one of the code signals. FIG. 7 only illustrates the code signal detector for levels #1 and #16. The code signal detectors for the other levels are identical and are only indicated to be available but not illustrated.

The code signal detectors each include correlation detecting means 46 and logic circuit means 47. Correlation detecting means 46 includes a coder 48 to generate the proper one of the pulses of signal S1 for the particular level and coder 49 to generate the appropriately times pulse for signal S2. These coders 48 and 49 could be delay lines of appropriate length energized from generator 44 to provide the properly timed pulses to correspond with the timing of the associated pulses of the particular level or code signal. For instance, coder 48 would produce a pulse timed like pulse 50 of FIG. 5 and coder 49 would produce a pulse timed like pulse 51 of FIG. 5, these two timed pulses representing level #1. The coders of the other code detectors would produce appropriately timed pulses to be in time coincidence with the timing of the pulses of the associated level upon which the code detector will operate.

The output of coders 48 and 49 are coupled to multipliers 52 and 53, respectively, for correlation of the locally generated pulses with the pulses being received at receiver 42. If level or code signal #1 is being received an output will result from the coindence of the pulses generated in coder 48 and 49 and the received pulses of associated level code signal. The outputs from multipliers 52 and 53 are integrated in integrators 54 and 55, respectively, the outputs of which are applied to threshold detectors 56 and 57 of the logic circuit means 47. When level or code signal #1 is detected, the threshold of detectors 56 and 57 will be exceeded and AND gate 58 will produce an output indicating the detection of level or code signal #1. The output from AND gate 58 will energize level #1 generator to provide the proper voltage level to correspond to the level detected in level detector 29 for level #1. The other level detectors will operate in the same manner and trigger their associated level generator to provide the proper amplitude. The output of the level generators, such as generator 59, is applied to a gating circuit 60 which is sampled serially by the output of source 45 to provide the detected data output on lead 61.

While I have described above the principles of my invention in connection with specific apparatus it is to be clearly understood that this description is made only by way of example and not as a limitation to the scope of my invention as set forth in the objects thereof and in the accompanying claims.

I claim:

1. A pseudo-orthogonal pulse code system comprising:
first means to generate at least a first group of orthogonal pulses;
second means to generate at least a second group of orthogonal pulses, said second group of pulses being orthogonal with respect to said first group of pulses;
third means coupled to said first and second means for combining a pulse of said first group of pulses with a pulse of said second group of pulses to make available a plurality of pseudo-orthogonal pulse code signals, each of said code signals representing a different one of a plurality of different pieces of information; and
fourth means coupled to said third means to select appropriate ones of said code signals to convey intelligence.

2. A system according to claim 1, wherein:
said third means makes available certain of said code signals having an orthogonal relationship between the pulses of only said second group of pulses and others of said code signals having an orthogonal relationship between the pulses of only said first group of pulses.

3. A system according to claim 1, wherein:
said third means makes available said code signals having an orthogonal relationship between the pulses of one of said first and second groups of pulses and a non-orthogonal relationship between the pulses of the other of said first and second groups of pulses.

4. A system according to claim 1, wherein:
said first means generates M orthogonal pulses, where $m$ is equal to an integer greater than one;
said second means generates $m'$ orthogonal pulses, where $m'$ is equal to an integer greater than one; and
said third means makes available $mm'$ pseudo-orthogonal pulse code signals.

5. A system according to claim 1, wherein:
said first means includes:
means to generate the pulses of said first group of pulses to occupy different time positions;
said second means includes:
means to generate the pulses of said second group of pulses to occupy different time positions; and
one of said first and second means includes:
means to time multiplex said first group of pulses with respect to said second group of pulses.

6. A system according to claim 1, further comprising;
a plurality of fifth means coupled to said third means, each of said fifth means detecting a different one of said code signals; and
sixth means coupled to said plurality of fifth means to recover said conveyed intelligence.

7. A system according to claim 6, wherein:
each of said fifth means includes:
correlation detecting means coupled to said third means, and
logic circuit means coupled to said correlation detecting means.

8. A system according to claim 7, wherein:
said correlation detecting means includes:
seventh means to generate a pulse having the same characteristic as the pulse of said first group of pulses present in the corresponding one of said code signals,
eighth means to generate a pulse having the same characteristic as the pulse of said second group of pulses present in said corresponding one of said code signals,
first multiplier means coupled to said third means and said seventh means, second multiplier means coupled to said third means and said eighth means,
first integrator means coupled to said first multiplier means, and
second integrator means coupled to said second multiplier means.

9. A system according to claim 8, wherein:
said logic circuit means includes:
first threshold detector means coupled to said first integrator means,
second threshold detector means coupled to said first integrator means, and
coincident gate means coupled to said first and second threshold detector means.

10. A pseudo-orthogonal pulse code demodulator comprising:
a source of a plurality of pseudo-orthogonal pulse code signals each representing a different piece of information appropriately selected to convey intelligence, each of said code signals having at least a first pulse selected from at least a first group of orthogonal pulses and at least a second pulse selected from at least a second group of orthogonal pulses, certain of said code signals having said first pulse non-orthogonal and said second pulse orthogonal and others of said code signals having said first pulse orthogonal and said second pulse non-orthogonal;
a plurality of first means coupled to said source, each of said first means detecting a different one of said code signals; and
second means coupled to said plurality of first means to recover said conveyed intelligence.

11. A demodulator according to claim 10, wherein:
each of said first means includes:
correlation detecting means coupled to said source, and
logic circuit means coupled to said correlation detecting means.

12. A demodulator according to claim 11, wherein:
said correlation detecting means includes:
third means to generate a pulse having the same characteristic as said first pulse,
fourth means to generate a pulse having the same characteristic as said second pulse,
fourth means to generate a pulse having the same characteristic as said second pulse,
first multiplier means coupled to said source and said third means,
second multiplier means coupled to said source and said fourth means,
first integrator means coupled to said first multiplier means, and
second integrator means coupled to said second multiplier means; and
said logic circuit means includes:
first threshold detector means coupled to said first integrator means,
second threshold detector means coupled to said second integrator means, and
coincident gate means coupled to said first and second threshold detector means.

References Cited

UNITED STATES PATENTS 3,209,259 9/1965 Huber.

OTHER REFERENCES

"Space-Aeronautics" Magazine; November 1962, page 51 etc.

RALPH D. BLAKESLEE, Primary Examiner

U.S. Cl. X.R.

325—38, 321